US000001193H

United States Statutory Invention Registration [19]

[11] Reg. Number: H1193

[43] Published: Jun. 1, 1993

Batra et al.

[54] METHOD OF PRODUCING COPPER ALLOYS WITH MANGANESE AND SELENIUM TO IMPROVE THERMAL STABILITY

[75] Inventors: Ravi Batra, Rockaway; Jerry C. LaSalle, Montclair; Sheldon Cytron, Mountain Lakes, all of N.J.

[73] Assignee: The United States of America as represented by the Secretary of the Army, Washington, D.C.

[21] Appl. No.: 744,040

[22] Filed: Aug. 12, 1991

[51] Int. Cl.[5] ..... C22C 9/05

[52] U.S. Cl. ..... 75/352; 75/333; 75/334; 75/338; 420/493; 148/403

[58] Field of Search ..... 75/352, 333, 334, 338; 420/493; 148/403

[56] References Cited

U.S. PATENT DOCUMENTS

| | | | |
|---|---|---|---|
| 4,059,437 | 11/1977 | Nesslage et al. | 420/493 |
| 4,900,355 | 2/1990 | Tanno et al. | 75/334 |

FOREIGN PATENT DOCUMENTS

| | | | |
|---|---|---|---|
| 2127563 | 12/1972 | Fed. Rep. of Germany | 75/334 |
| 1-142005 | 6/1989 | Japan | 75/334 |
| 1-312016 | 12/1989 | Japan | 75/334 |

OTHER PUBLICATIONS

Metals Handbook, 9th Ed, vol. 7; "Atomization", pp. 25-51.

*Primary Examiner*—Donald P. Walsh
*Assistant Examiner*—Ngoclan T. Mai
*Attorney, Agent, or Firm*—Anthony T. Lane; Edward Goldberg; Edward F. Costigan

[57] ABSTRACT

This invention describes a process for producing copper alloys by rapid solidification in order to improve their strength and thermal stability after being exposed to elevated temperatures. The method used to rapidly solidify the molten alloy is either by use of a high pressure non-oxidizing gas spray to atomize the molten alloy into a powder or to pour the molten alloy onto a rotating wheel to form a ribbon which is then attrited into powder. The powder is canned, compacted to full density and cold worked to the desired shape.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF PRODUCING COPPER ALLOYS WITH MANGANESE AND SELENIUM TO IMPROVE THERMAL STABILITY

GOVERNMENTAL INTEREST

The invention described herein may be manufactured, used, and licensed by or for the Government for Government purposes without payment to me of any royalties thereon.

FIELD OF THE INVENTION

This invention relates in general to a method of producing copper alloys and in particular to copper alloys having high conductivity as well as strength after being exposed to elevated temperatures.

BACKGROUND OF THE INVENTION

Presently available copper alloys containing ten to fifty ppm each of manganese and selenium are known from U.S. Pat. No. 4,311,522. These copper alloys have a softening temperature of about 425° C. In an industrial environment, during fabrication, the in line annealing process involves temperatures of 480° C. to 540° C. Such temperatures destroy the thermal stability of these prior art alloys and renders them useless for high temperature applications. Typical applications for high conductivity copper alloys include rotor windings for various devices such as motors, generators and solenoids. welding electrodes and, heat sink arrangements for the removal of heat from electronic devices. Currently, these prior art alloys are produced by conventional ingot metallurgy techniques. Such techniques require the material to be homogenized and hot worked at 800° C. to 900° C. in order to break up the cast structure. Subsequently, thermal stability is imparted to these alloys by extensive cold work.

SUMMARY AND OBJECTS OF THE INVENTION

It is an object of the invention to provide a method for making copper alloys that have high conductivity as well as retain their strength after being exposed to elevated temperatures. It is a further object of the invention to provide such high conductivity copper alloys which are especially suitable for applications such as rotor windings for motors, electrical servo mechanisms, solenoid devices, generators and the like, welding electrodes, heat sinks for the removal of heat from electronic devices, and other similar applications.

It is still another object of the invention to provide a method of manufacturing copper alloys which overcomes the disadvantages of prior art practices.

According to the present invention copper alloys are produced having superior high temperature strength and thermal stability. These advantages are achieved by the rapid solidification of the alloy according to the process of the invention.

The invention provides rapid solidification by an atomizing technique employing a high pressure inert gas spray. The invention also contemplates an alternative technique including pouring a stream of the molten alloy onto a rotating wheel.

The rapid solidification causes the alloy to be extremely fine grained and to have a very small but stable grain size. This is at least partially due to the grain pinning effect of complex precipitates of manganese and selenium.

A rapid solidification method according to the invention includes the pouring of the molten alloy onto the rotating wheel. This results in the alloy forming a ribbon. The ribbon is then attrited into a powder. If the atomization method is used, the alloy is already in a powder form. The powder can then be canned and consolidated into usable forms.

The process according to the invention provides significant advantages including that the alloys are extremely fine grained, and that the strength and thermal stability of these alloys are greatly enhanced because of the cold work and very small but stable grain size.

It is a further object of this invention to provide a method of producing superior alloys which is simple in design, economical to perform and robust in practice.

The various features of novelty which characterize the invention are pointed out with particularity in the claims annexed to and forming a part of this disclosure. For a better understanding of the invention, its operating advantages and specific objects attained by its uses, reference is made to the descriptive matter in which preferred embodiments of the invention are illustrated.

DETAILED DESCRIPTION OF THE PREFERRED EMBODIMENTS

The method of making superior alloys according to the invention includes melting oxygen free copper under non-oxidizing conditions and adding 10 to 50 ppm each of manganese and selenium to form a molten alloy.

The molten alloy is then rapidly solidified in one of the following processes.

ATOMIZING PROCESS

The molten alloy may be converted to powder by atomizing. According to this method a high pressure non-oxidizing gas spray is employed to produce drops which are in the 10 to 200 micrometer range.

CENTRIFUGAL—ROTATING WHEEL PROCESS

The molten alloy can be formed into a thin ribbon. This is accomplished by bottom pouring the molten alloy through a small hole of about 0.090 inches in diameter onto a water cooled copper wheel which rotates at about 6 thousand linear feet per minute.

In a subsequent process the ribbon is then attrited into powder.

The powder produced by either method is canned, consolidated by one of the commercially available processes such as extrusion, HIP, vacuum hot pressing, dynamic compaction, etc. and cold worked to the desired shape. The thermal stability is dependant on the amount of cold work imparted.

While specific embodiments of the invention have been shown and described in detail to illustrate the application of the principles of the invention, it will be understood that the invention may be embodied otherwise without departing from such principles.

What is claimed is:

1. A method of producing copper alloys comprising the steps of:

adding 10 to 50 ppm each of manganese and selenium to molten oxygen free copper to form a molten alloy; and rapidly solidifying (RS) said molten alloy to form into RS fine powder.

2. A method in accordance with claim 1, wherein; said step of rapid solidification is performed by atomization with a high pressure non-oxidizing gas spray.

3. A method in accordance with claim 1, wherein; said rapid solidification is performed by pouring said molten alloy onto a rotating wheel in a non-oxidizing atmosphere.

4. A method in accordance with claim 3, wherein; said pouring is bottom pouring through a hole.

5. A method in accordance with claim 4, wherein;

said hole is approximately 0.09 inches in diameter.

6. A method in accordance with claim 3, wherein; said rotating wheel is cooled.

7. A method in accordance with claim 6, wherein; said rotating wheel is cooled by water.

8. A method in accordance with claim 6, wherein; said rotating wheel is made of copper.

9. A method in accordance with claim 3, wherein; said rotating wheel is rotating at approximately 6,000 linear feet per minute.

10. A method in accordance with claim 1, wherein; said powder is canned and consolidated in non-oxidizing atmosphere.

* * * * *